March 2, 1926.  1,575,226
F. PICHLER
WALL FOR VESSELS SUBJECTED TO EXTERIOR OVERPRESSURE
Filed Jan. 25, 1924
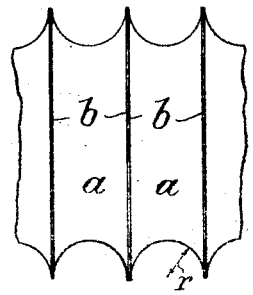
Friedrich Pichler
INVENTOR;
By
his Attorney.

Patented Mar. 2, 1926.

1,575,226

UNITED STATES PATENT OFFICE.

FRIEDRICH PICHLER, OF INGOLSTADT, GERMANY.

WALL FOR VESSELS SUBJECTED TO EXTERIOR OVERPRESSURE.

Application filed January 25, 1924. Serial No. 688,628.

*To all whom it may concern:*

Be it known that I, FRIEDRICH PICHLER, citizen of Germany, residing at Ingolstadt, Bavaria, Germany, have invented certain new and useful Improvements in Walls for Vessels Subjected to Exterior Overpressure (for which an application was filed in Germany March 23, 1922); and I do hereby declare the following to be a full, clear, and exact description of the invention, such as will enable others skilled in the art to which it appertains to make and use the same.

According to the present invention the walls of vessels subjected to exterior overpressure are so shaped that their individual parts are subjected only to tensile forces and can therefore be made as thin as possible, thereby achieving considerable economy in constructive material and greatly reducing the weight of the vessel.

To this end the walls of the vessel are composed of separate units with trough or groove-shaped outer surfaces, of which the semi-circular section is formed with a particular radius found by calculation.

The accompanying drawing shows a part of a vessel according to the present invention with a, for example, cylindrical form.

The walls of this vessel consist of open annular units (*a*) of thin material, of which the circumference is semicircular in section. This semicircular shape of the circumference results in the material of the walls being subjected only to tensile forces by the exterior over-pressure on the vessel. This again makes it possible to construct the walls as thin as is consistent with the greatest over-pressure to be expected, thereby reducing the total weight of the vessel as much as possible. The radius (*r*) of the groove or trough-shaped circumference of the wall units is in each case chosen or calculated in accordance with the pressure which the vessel is destined for and according to the sphere of use for which the vessel is intended. The joining of the individual wall units can be accomplished by rivetting or the like with the help of stiffening rings (*b*).

What I claim as my invention and desire to secure by Letters Patent is:

1. As a new article of manufacture, a thin wall for vessels subject to heavy external pressures, said wall consisting of a series of juxtaposed curved units, the outer surface of each unit presenting an uninterrupted concave curvature only and the total area of the juxtaposed parts of the units being so minute as compared with the area of the curved portions that the major portions of the wall constituted by the part of concave curvature are subjected only to tensile stresses and the relatively minute portions of the wall at which the units are juxtaposed are subjected to compressive strains within the material of the wall upon the occurrence of a substantial exterior pressure.

2. As a new article of manufacture, a wall for vessels subject to heavy external pressures, said wall consisting of a series of juxtaposed curved units the wall thickness of which is from 0.01 millimeter to 3 millimeters, the outer surface of each unit presenting an uninterrupted concave curvature only, the radius of which curvature is from 30 millimeters to 2000 millimeters, the total area of the juxtaposed parts of the units being so minute as compared with the area of the curved portions that the major portions of the wall constituted by the parts of concave curvature are subjected only to tensile stresses and the relatively minute portions of the wall at which the units are juxtaposed are subjected to compressive strains within the material of the wall upon the occurrence of a substantial exterior pressure.

In testimony whereof I hereunto affix my signature.

FRIEDRICH PICHLER.